US007272364B2

(12) United States Patent
Frank et al.

(10) Patent No.: US 7,272,364 B2

(45) Date of Patent: Sep. 18, 2007

(54) METHOD AND SYSTEM FOR MINIMIZING OVERLAP NULLING IN SWITCHED BEAMS

(75) Inventors: Colin Frank, Park Ridge, IL (US); Yuda Luz, Buffalo Grove, IL (US); Jason Jiangnan Chen, Hawthorn Woods, IL (US); John Touvannas, Lake Zurich, IL (US)

(73) Assignee: Motorola, Inc., Schaumburg, IL (US)

( * ) Notice: Subject to any disclaimer, the term of this patent is extended or adjusted under 35 U.S.C. 154(b) by 488 days.

(21) Appl. No.: 10/335,605

(22) Filed: Dec. 30, 2002

(65) Prior Publication Data

US 2004/0127174 A1 Jul. 1, 2004

(51) Int. Cl.
*H04B 7/00* (2006.01)
*H04B 1/02* (2006.01)

(52) U.S. Cl. .................. 455/101; 455/33.1; 455/277.1

(58) Field of Classification Search .............. 455/10.1, 455/129, 277.1, 277.2, 562, 33.1, 33.2, 33.3, 455/33.4, 422, 443; 342/372, 373, 374, 375, 342/354, 81, 154

See application file for complete search history.

(56) References Cited

U.S. PATENT DOCUMENTS

| | | | | |
|---|---|---|---|---|
| 5,493,306 | A | 2/1996 | Rudish et al. | |
| 5,565,873 | A * | 10/1996 | Dean | 342/372 |
| 5,848,060 | A * | 12/1998 | Dent | 370/281 |
| 5,924,020 | A * | 7/1999 | Forssen et al. | 455/129 |
| 6,304,214 | B1 * | 10/2001 | Aiken et al. | 342/362 |
| 2001/0049295 | A1 * | 12/2001 | Matsuoka et al. | 455/562 |
| 2002/0072393 | A1 | 6/2002 | McGowan et al. | |
| 2004/0092291 | A1 | 5/2004 | Legnain et al. | |

FOREIGN PATENT DOCUMENTS

WO WO 01/47148 6/2001

OTHER PUBLICATIONS

Weam-Juhn Wang, I-Tai Lu, Shang-Chich Liu, "*Soft Analysis of CDMA Systems Using Novel Switched-Beam Smart Antennas with Polarization Diversity*", IEEE, VTC '01, pp. 243-247.

* cited by examiner

*Primary Examiner*—Tony T. Nguyen

(57) ABSTRACT

A wireless system, which minimizes nulls within the wireless system, while simultaneously providing diversity. A wireless system will now have increased capacity and coverage due to an enhanced signal to interference ratio in the areas of beam overlap. The system uses time or frequency offset on the signals input to an antenna to minimize interference in the regions of beam overlap. Additionally, polarization diversity can be introduced using Butler Matrices in conjunction with array elements to enhance the interference reduction.

8 Claims, 6 Drawing Sheets

TABLE 1

| ANTENNA | ELEMENT1 | ELEMENT2 | ELEMENT3 | ELEMENT4 | BEAM DIRECTION | INTER ELEMENT PHASING |
|---|---|---|---|---|---|---|
| PORT1 (1R) | -225° | -180° | -135° | -90° | -14.5° | 45° |
| PORT2 (2L) | 45° | -90° | -225° | 0° | 48.6° | -135° |
| PORT3 (2R) | 0° | -225° | -90° | 45° | -48.6° | 135° |
| PORT4 (1L) | -90° | -135° | -180° | -225° | 14.5° | -45° |

*FIG. 10*

METHOD AND SYSTEM FOR MINIMIZING OVERLAP NULLING IN SWITCHED BEAMS

FIELD OF THE INVENTION

This invention relates generally to wireless communication systems that include a technique to reduce the amount of interference transmitted on the forward link and to reduce the amount of interference seen on the uplink. More specifically, the present invention relates to reducing the effect of nulling resulting from destructive interference between overlapping beams in a wireless communication system.

BACKGROUND OF THE INVENTION

In an effort to reduce interference in wireless systems, several beam architectures have been devised and implemented in the wireless communication field. Adaptive antenna implementations use a separate narrow tracking beam for each mobile in order to reduce the amounts of interference transmitted on the forward link and to reduce the amount of interference seen on the uplink. Each user is tracked by a separate beam within a sector. Adaptive antenna systems are generally expensive due to the need for calibration of the signal paths between the baseband processor and the array as well as the need for advanced signal processing.

Switched beam methods are simpler to use than fully adaptive methods. In switched beam implementations, a set of beams is used to cover a sector, satisfying the requirement that all locations in the sector are covered by at least one beam. Calibration is not required for switched beam architectures, if one cable is used per beam. In order to maximize the capacity and coverage increase associated with a fixed number of beams, the beams should exactly cover the area of the sector with minimal overlap between adjacent beams consistent with full coverage of the sector. In the area of overlap, the beams can interfere destructively due to their uncontrolled phase relationship, resulting in nulls or "holes" in the sector coverage in which it is difficult to communicate with a user without greatly increasing the amount of power used to transmit the signal to this user.

This invention presents a method to minimize the creation of nulls within the area of overlapping beams, while simultaneously providing diversity, thus providing a wireless system with increased capacity and coverage.

SUMMARY OF THE INVENTION

The present invention advances the art by contributing a wireless system that addresses the aforementioned drawbacks with the prior art.

One form of the present invention is a system comprising a plurality of line feeds some of which may carry a signal, a plurality of offset circuits to offset the signal in either time or frequency, an antenna which transmits beams having time or frequency offset and having partial overlap. The antenna may consist of a Butler Matrix and an element array in operation together to provide polarization diversity of some adjacent transmitted beams in addition to the time or frequency offset of the transmitted beams.

The forgoing system and other systems as well as features and advantages of the present invention will become further apparent from the following detailed description of the presently preferred embodiments, read in conjunction with the accompanying drawings. The detailed description and drawings are merely illustrative of the present invention rather than limiting, the scope of the present invention being defined by the appended claims and equivalents thereof.

BRIEF DESCRIPTION OF THE DRAWINGS

The present invention is illustrated by way of example and not limitation in the accompanying figures, in which like references indicate similar elements, and in which:

FIG. 10 illustrates TABLE 1, which outlines the phase progression and beam direction for the four ports illustrated in FIG. 9.

DETAILED DESCRIPTION OF THE PRESENTLY PREFERRED EMBODIMENTS

Figure 1:
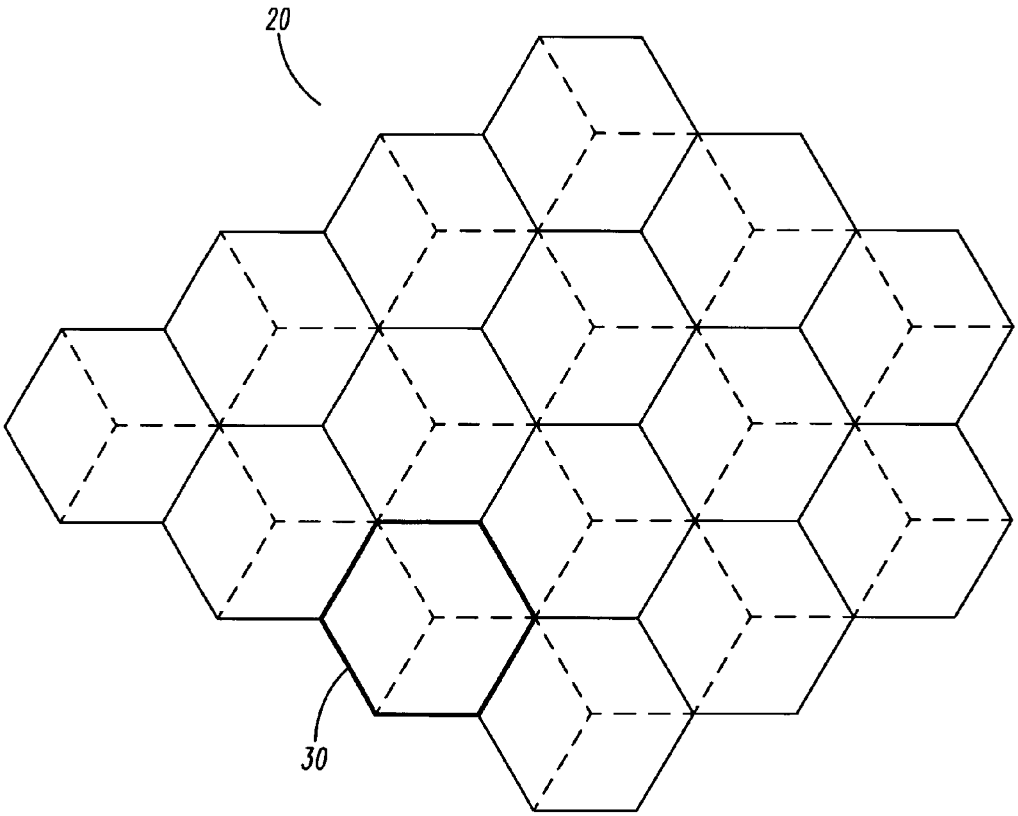
FIG. 1 illustrates schematically, in an overview, the layout of a three sector cell layout.

FIG. 1 illustrates a wireless cell layout 20 containing 15 cells, of which a cell 30 is outlined in bold. Each cell is divided into three equal sectors by dashed lines at 120° from each other. For facilitating a simple description of the principles of the present invention, further description of the present invention is directed to cell 30. Those having ordinary skill in the art will appreciate the applicability of the description of cell 30 to the other cells of cell layout 20.

Figure 2:
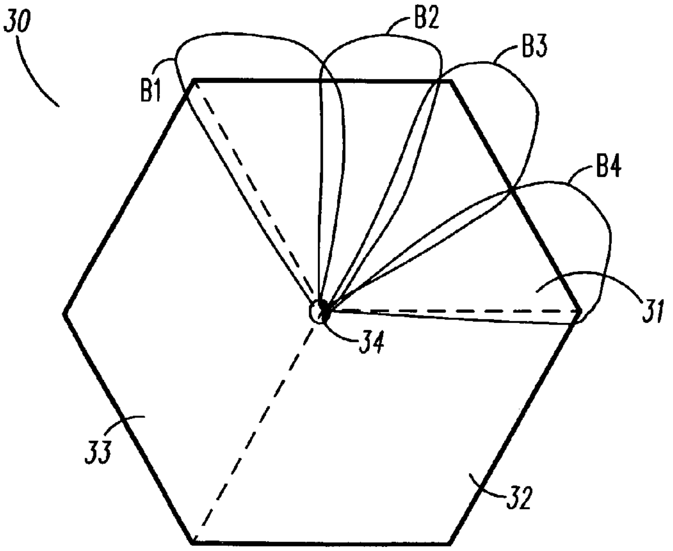
FIG. 2 illustrates schematically, in an overview, four beams covering a sector of a cell.

FIG. 2 illustrates cell 30 having three sectors 31-33 and including an antenna 34 located at the point shared with sectors 31-33. Four beams B1-B4 transmitted from antenna 34 cover the entire area of sector 31 as required for effective transmission to all receivers (not shown) in sector 31. For facilitating a simple description of the principles of the present invention, further description of the present invention is directed to sector 31. Those having ordinary skill in the art will appreciate the applicability of the description of sector 31 to the other sectors of cell 30.

Figure 3:
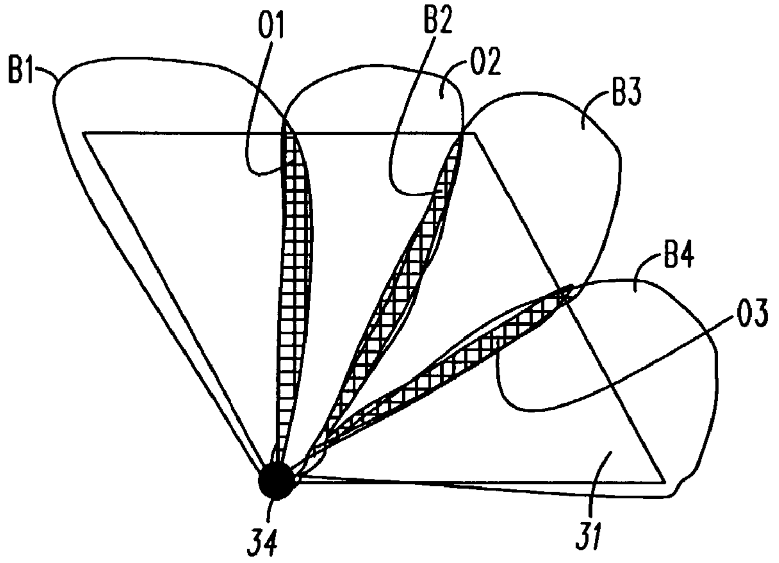
FIG. 3 illustrates schematically, in an overview, the areas of interference among the four beams illustrated in FIG. 2.

FIG. 3 illustrates an overlap between the beams B1-B4 that is required to completely cover sector 31. The area of intersection between beam B1 and beam B2 is crosshatched overlap O1. The area of intersection between beam B2 and beam B3 is crosshatched overlap O2. The area of intersection between beam B3 and beam B4 is crosshatched overlap O3. The overlap regions O1-O3 are regions where nulls may form due to the uncontrolled and unknown gain and phase relationship of the antenna feeds for the different beams B1-B4. End-to-end calibration, of the radio frequency receive and transmit chains between the baseband processing and the antenna, is required to control the antenna pattern in the beam overlap O1-O3 regions, so as to minimize nulls. Calibration can be implemented by alternately adding a very weak calibration pilot signal, to the baseband transmit signals for each of the beams B1-B4 and coupling the radio frequency transmit signals back into one of the receive chains at the antenna 34. While there are no theoretical barriers to the implementation of calibration of the antenna arrays, calibration is sometimes impractical due to either cost or difficulties in modifying the base stations already in the field to support calibration.

For switched beam architectures, there is only one demodulation pilot per sector which is different than the calibration pilot described above, but there are in general many traffic signals per sector. Because the mobile receiver (not shown) uses the demodulation pilot (not shown) to demodulate the traffic signal, the demodulation pilot and traffic channel can be mismatched in switched beam systems, in the overlap regions O1-O3 between beams B1-B4, if the mobile receiver is illuminated by a beam B1, but the traffic channel is not transmitted on beam B1. Depending on the implementation, the switched beam system diversity may or may not be available in the beam overlap regions O1-O4. If a single array is used to generate all of the beams and the elements of the array are half-wavelength spaced and share a common polarization, diversity will not be available in the beam overlap region. However, diversity will be available if orthogonal polarizations are used for adjacent beams, and this can be accomplished by using a dual-polarized array.

In general, switched beam systems will be preferable to systems using only sectorization but having a number of sectors comparable to the number of beams in the switched beam system. The reason for this preference is that in a highly sectorized system having six or more sectors, the mobile receiver, which initiates soft and softer handoffs based on measurements of the pilots from each of the sectors. The mobile receiver will see a large number of pilot signals and will make an excessive number of requests to either initiate or terminate soft and softer handoff relationships with these sectors. The large number of messages related to soft and softer handoff will put an excessive burden on the base station controller and may also reduce the capacity of the system.

This invention describes a manner in which to enhance the signal to interference ratio in the regions of beam overlap. This invention describes a system which implements a switched beam architecture to minimize nulls in the beam overlap region without requiring end-to-end calibration of the radio frequency transmit and receive and circuitry between the baseband transmit and receive processing and the antennas. For the purpose of discussion, the focus will be primarily upon CDMA applications, including CDMA2000 and WCDMA, although the techniques described below are not limited to this application.

Figure 4:
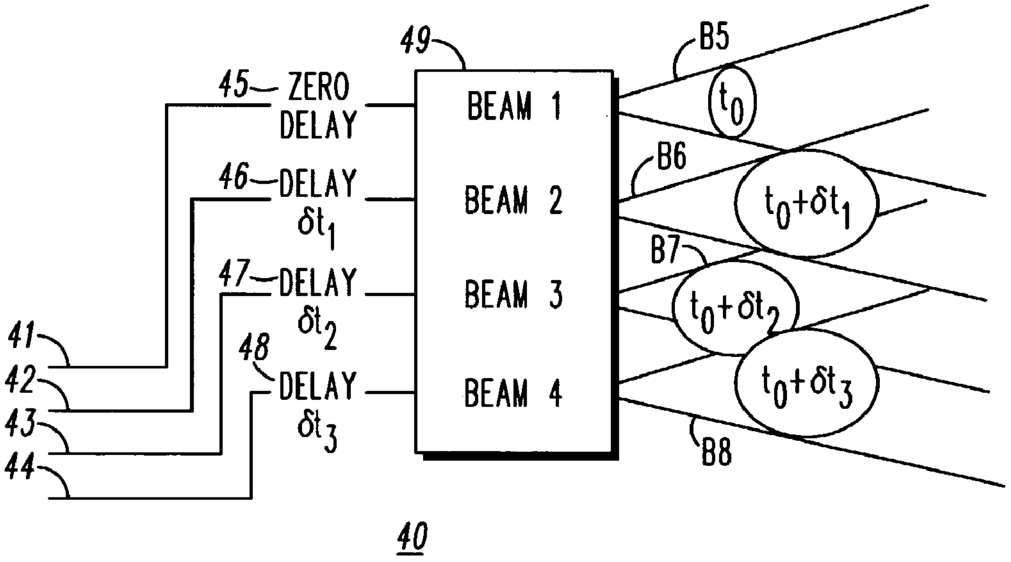
FIG. 4 illustrates schematically, a circuit to provide time offset in the four beams illustrated in FIG. 2.

As illustrated in FIG. 4, an antenna system 40 has four line feeds 41-44. The signal on these line feeds 41-44 are each modified by a corresponding time delay circuitry 45-48 prior to being fed into beam source 49. The time delay circuitry 45-48 collectively ensure that each of the four beams B5-B8 transmitted from the beam source 49 are offset in time with respect to each other by one or more chips. The beam B5, having no offset, is set for time $t_0$. Beams B6, B7, and B8 have offsets of δt, $\delta t_2$ and $\delta t_3$, respectively, from $t_0$, the time of beam B5. In an alternative embodiment, the timing of beam B5 and beam B7 can actually be the identical since beam B5 and beam B7 do not overlap within the sector as shown in FIG. 4. In an alternative embodiment, beam B8 has the same timing as beam B6 since beams B6 and B8 do not overlap within the sector. The fundamental restriction on the time offsets of the beams is that adjacent beams do not share the same time offset.

If possible, it is desirable that the time offset between adjacent beams be chosen so it is not equal to the negative of the time offset of any two multipath delays received at the mobile receiver from adjacent beams. When this constraint is satisfied, the beams interfere only in a random sense, and no nulls or peaks will result in the sum pattern resulting from the overlap of the two beams. If the time delay between adjacent beams is larger than the maximum delay spread of the channel, the beams can never interfere. Typically, however, the time offset δt used between the adjacent beams will only be a few chips, so as to not exceed the search or tracking window allocated to the phase of the pseudo-noise (PN) sequence allocated to that sector.

Figure 5:
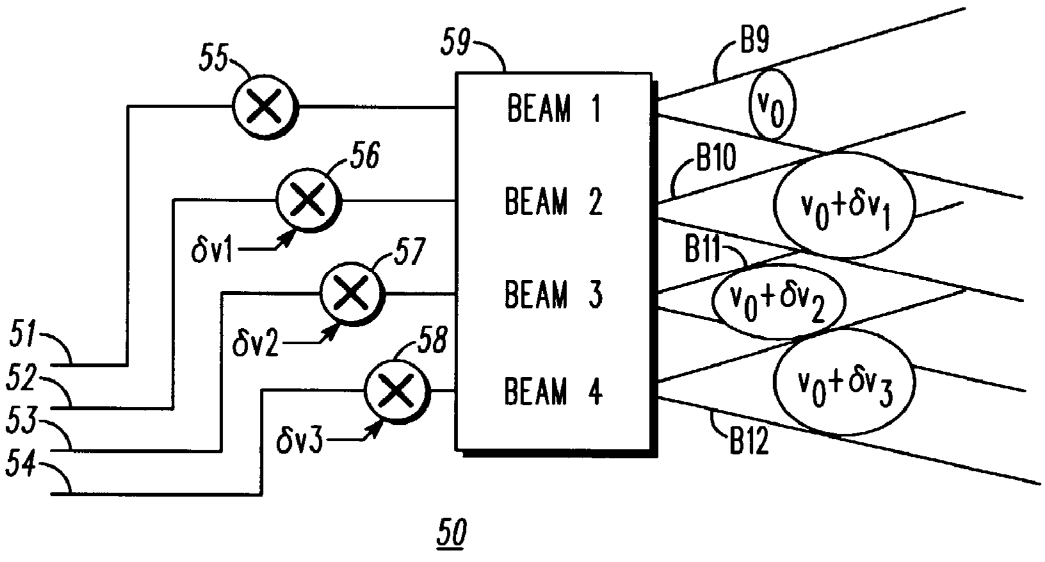
FIG. 5 illustrates schematically, a circuit to provide frequency offsets in the four beams illustrated in FIG. 2.

A second technique to implement switched beam architectures which minimizes nulls in the beam B5-B8 overlap regions O1-O3 and without end-to-end calibration of the radio frequency transmit and receive circuitry is illustrated in FIG. 5. As illustrated in FIG. 5, an antenna system 50 has four line feeds 51-54. These line feeds 51-54 are each modified by a corresponding frequency delay circuitry 55-58 on the line feed prior to being fed into beam source 59. The frequency delay circuitry 55-58 collectively ensure that each of the four beams B9-B12 transmitted from the beam source 59 are offset in frequency with respect to each other by $\delta\nu_1$, $\delta\nu_2$, and $\delta\nu_3$ Hertz. The beam B9 having no offset, is set for frequency $\nu_0$. Beam B10 has an offset of $\delta\nu_1$ from $\nu_0$, the frequency of beam B9. The beam B11 is frequency offset from $\nu_0$ by an additional frequency shift indicated by $\delta\nu_2$. In an alternative embodiment, the frequency of beam B9 and beam B11 can actually be identical since beam B9 and beam B11 do not significantly overlap as shown in FIG. 5. Beam B12 is illustrated as having a frequency shift from $\nu_0$ of $\delta\nu_3$. In an alternative embodiment, beam B12 has the same frequency as beam B10 since beams B10 and B12 do not significantly overlap. The fundamental restriction on the frequency offsets of the beams is that adjacent beams do not share the same frequency offset.

This technique of using frequency offsets rather than time delay offsets for adjacent beams has the advantage that it preserves the orthogonality of adjacent beams in an exact sense. There will be zero cross correlation for all but the desired symbol of signals on the adjacent beam. However, this approach will introduce fast fading of the desired signal in the beam overlap regions O1-O3 and this may be undesirable for standardized CDMA systems such as the 3GPP2 standard, CDMA2000 1× enhanced voice—data and voice (1×EVDV), and the 3GPP standard, high speed data packet access (HSDPA) which use signal-to-noise ratio feedback from the mobile and fast scheduling to transmit to the mobile during time intervals when the channel is good.

Commercial CDMA systems have been deployed, which operate at frequencies between 800 MHz and 1 GHz and between 1.8 GHz and 2 GHz. For the system illustrated in FIG. 5, the frequency offsets might typically be in the range of 10 Hz to 100 Hz. The typical time offsets, for the system illustrated in FIG. 4, will be in the range of 1 to 10 chips. For CDMA systems such as IS-95 and CDMA2000 1×, the chip rate of the system is 1.2288 megachips per second, and thus a chip corresponds to 81.38 microseconds. The described technology was illustrated with 3 sectors and 4 beams per sector, which is typical. It will be understood by those of average skill in the art that this technique applies for fewer or more sectors as well as fewer or more beams per sector.

For example, the same techniques can also be applied for 2, 3, 5, 6, or more beams per sector as well as to cells with 1, 2, 4, or more sectors.

Figure 6:
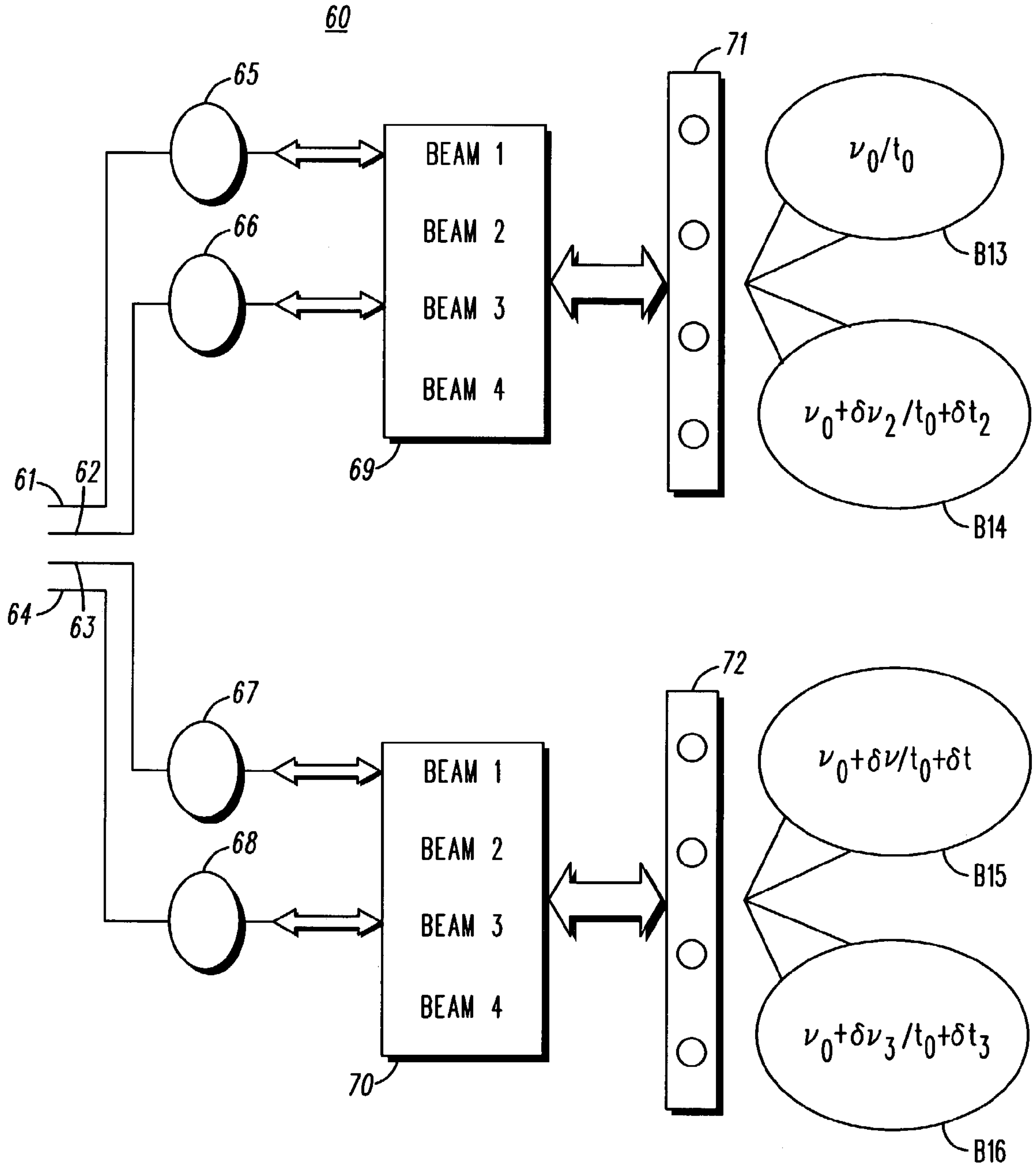
FIG. 6 illustrates schematically, a circuit to provide polarization diversity in combination with the circuits illustrated in FIG. 4 and FIG. 5.

The techniques of using either frequency offsets or time delay offsets to minimize interference between adjacent beams, can be enhanced by the addition of polarization diversity between adjacent beams. FIG. 6 illustrates a system 60 consisting of a pair of Butler Matrices 69 and 70 operating in combination with a pair of orthogonally polarized (e.g., horizontal and vertical or dual-slant) four element array polarizers 71 and 72, respectively, with half wavelength spacing between the array elements. The four clement array polarizers 71 and 72 can be physically on top of each other, although they are illustrated as being separated in FIG. 6. Also, the illustration has been modified to illustrate which beam is transmitted from which four element array polarizers, when in fact, beam B14 is adjacent to and in between beams B15 and B16, while beam B15 is adjacent to and in between beam B13 and B14. As illustrated in FIG. 6, the data on the antenna line feeds 61-64 is modified by the circuitry 65-68, respectively, to provide either frequency offsets or time delay offsets to the data on the respective line feeds. The line feeds 61 and 62 are fed into beam one and beam three, respectively, of the first Butler Matrix 68, which operates with the four-element array 71 to transmit beams B13 and B14. The line feeds 63 and 64 are fed into beam two and beam four, respectively, of the second Butler Matrix 70, which operates with the four-element array 72 to transmit beams B15 and B16. Beam B14 is adjacent to and in between beams B15 and B16, while beam B15 is adjacent to and in between beam B13 and B14. The first four-element array 71 transmits the first beam B13 and third beam B14 with the same first polarization, while the second four-element array 72 transmits the second beam B15 and fourth beam B16 with the same second polarization, which is orthogonal to the first polarization of beams B13 and B14.

The first output beam B13 is offset in frequency or time from the adjacent second output beam B15. First output beam B13 is also orthogonally polarized relative to the polarization of the adjacent second output beam B15. The beams B13 and B15 propagate in directions that place them adjacent to and slightly overlapping with each other. The third output beam B14, transmitted from the first four-element array 71, is spatially separated from the first output beam B13, and has the same polarization is as beam B13. The third output beam B14 is adjacent to and slightly overlapping with beams B15 and B16, is offset in frequency or time from beams B15 and B16, and the polarization of beam B14 is orthogonal to the common polarization of beams B15 and B16.

As described above, the offset in time or frequency is only required for the adjacent beams so that the circuit elements 65 and 66, which introduce the time or frequency offset, can either be the same element, or can both be removed from the feed lines 61 and 62, respectively, since first output beam B13 and third output beam B14 do not significantly overlap spacially. In like manner, the circuit elements 67 and 68, which introduce the time or frequency offsets for second output beam B15 and fourth output beam B16, respectively, can be identical. Elements 67 and 68 are required in the signal paths 63 and 64, respectively, if the circuit elements 65 and 66 are omitted from the feed lines 61 and 62, respectively, to ensure the time or frequency offset of adjacent beams. Conversely, elements 65 and 66 are required in the signal paths 61 and 62, respectively, if the circuit elements 67 and 68 are omitted from the signal paths 63 and 64, respectively, to ensure the time or frequency offset of adjacent beams.

Figure 7:
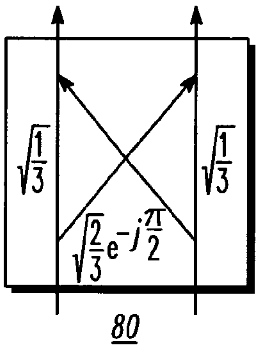
FIG. 7 illustrates schematically a 4.77 dB 90 degree phase lag coupler.
Figure 8:
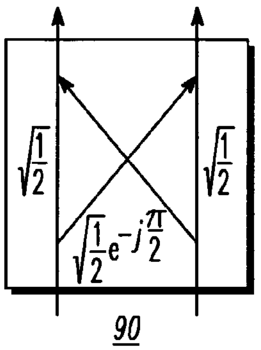
FIG. 8 illustrates schematically a 3 dB 90 degree phase lag coupler.

FIG. 7 illustrates a schematic diagram 80 of a 4.77 dB 90° phase lag coupler in which one third of the electric field on an input line of the coupler is transmitted along the same line with no phase change. The remaining two thirds of the electric field on an input line of the coupler is transferred to the other line in the coupler, with a phase lag of 90°. This will provide a 90° phase shift between the output lines with a 3 to 1 output power ratio. FIG. 8 illustrates a schematic diagram 90 of a 3 dB 90° phase lag coupler in which one half of the electric field on an input line of the coupler is transmitted along the same line with no phase change. The remaining half of the electric field on an input line of the coupler is transferred to the other line in the coupler, with a phase lag of 90°. This will provide a 90° phase shift between the output lines with a 2 to 1 output power ratio.

Figure 9:
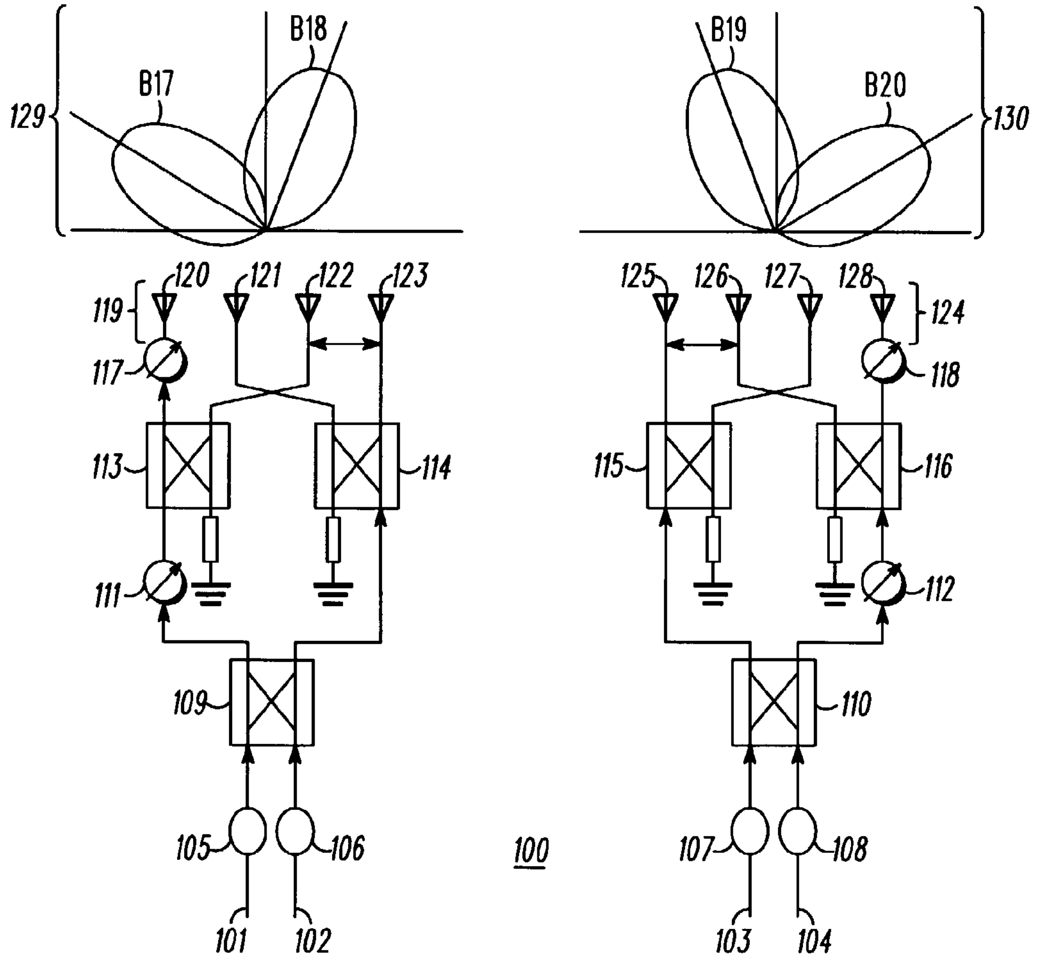
FIG. 9 illustrates schematically an implementation and output beams of polarization diversity circuit with tapering provided by the couplers illustrated in FIGS. 7 and 8.

FIG. 9 illustrates the use of the phase lag couplers described in FIGS. 7 and 8 in a system 100. This system is a more detailed equivalent to system 60 in FIG. 6. The line feed 101 is modified by the circuit 105 to shift the time or frequency, as desired for the system, and the resulting signal is input into the left port of a first 3 dB 90° phase lag coupler 109. The line feed 102 is modified by the circuit 106 to shift the time or frequency, as desired for the system, and the resulting signal is input into the right port of a first 3 dB 90° phase lag coupler 109. The left output port of the first 3 dB 90° phase lag coupler 109 enters a minus 45 phase shifter 111. The output of the phase shifter 111 is input into the left input port of a first 4.77 dB 90° phase lag coupler 113. The right output port of the first 3 dB 90° phase lag coupler 109 is input into the right port of a second a 4.77 dB 90° phase lag coupler 114. The right input port of the first 4.77 dB 90° phase lag coupler 113 and the left input port of the second 4.77 dB 90° phase lag coupler 114 are each terminated with a 50 ohm resistor. The left output port of the first 4.77 dB 90° phase lag coupler 113 enters a minus 180° phase shifter 117. The output of the minus 180° phase shifter 117 is input into the first element 120 of a first four-element array 119. The right output port of the first 4.77 dB 90° phase lag coupler 113 is input into the third element 122 of the first four-element array 119. The right output port of the second 4.77 dB 90° phase lag coupler 114 is input into the fourth element 123 of the first four-element array 119. The left output port of the second 4.77 dB 90° phase lag coupler 114 is input into the second element 121 of the first four-element array 119.

The line feed 103 is modified by the circuit 107 to shift the time or frequency, as desired for the system, and the resulting signal is input into the left port of a second 3 dB ninety 90° phase lag coupler 110. The line feed 104 is modified by the circuit 108 to shift the time or frequency, as desired for the system, and the resulting signal is input into the right port of a second 3 dB 90° phase lag coupler 110. The right output port of the second 3 dB ninety degree phase lag coupler 110 enters a minus 45° phase shifter 112. The output of the phase shifter 112 is input into the right input port of a third 4.77 dB 90° phase lag coupler 116. The left output port of the second 3 dB 90° phase lag coupler 110 is input into the left port of a fourth a 4.77 dB 90° phase lag coupler 115. The left input port of the third 4.77 dB 90° phase lag coupler 116 and the right input port of the fourth 4.77 dB 90° phase lag coupler 115 are each terminated with a 50 ohm resistor. The right output port of the third 4.77 dB 90° phase lag coupler 116 enters a minus 180° phase shifter 118. The output of the minus 180° phase shifter 118 is input into the fourth element 128 of a second four-element array 124. The left output port of the third 4.77 dB 90° phase lag coupler 116 is input into the second element 126 of the second four-element array 124. The right output port of the fourth 4.77 dB 90° phase lag coupler 115 is input into the third element 127 of the second four-element array 124. The left output port of the fourth 4.77 dB 90° phase lag coupler 115 is input into the first element 125 of the second four-element array 124.

The pair of antenna elements 120 and 125 can be co-located, as can the antenna element pairs 121 and 126, pair 122 and 127, and pair 123 and 128 so as to minimize the size and visual profile of the array.

The shape and direction of the output beams B13, B15, B14 and B16 from this system 100 are illustrated as they would be transmitted with respect to the first four-element array 119 consisting of elements 120, 121, 122, 123 and with respect to the second four element array 124 consisting of elements 125, 126, 127, 128. Beams B17 and B18 are both part of the output pattern 129 transmitted from the four-element array 119 and both beams have the same first polarization. Beams B19 and B20 are both part of the output pattern 130 transmitted from the four-element array 124 and they both have the same second polarization, which is orthogonal to the first polarization of beams B17 and B18. Typically, the first and second polarizations are either vertical and horizontal, or +45° and −45° (dual-slant), where polarization is defined in the plane perpendicular to the direction of signal propagation.

FIG. 10 illustrates TABLE 1, which outlines the phase progression of the signals input to feeds 101 (Port 1) and 102 (Port 2) after they pass through the beam forming network to Elements 1-4 of array 119 (that is, elements 120-123), as well as the signals input to feeds 103 (Port 3) and 104 (Port 4) after they pass through the beam forming network to Elements 1-4 of array 124 (that is, elements 125-128). Port 1 refers to line feed 101 in FIG. 9 and the output is transmitted as beam B18 with a 75.7° angle from the plane of the four-element array 119. Port 2 refers to line feed 102 in FIG. 9 and the output is transmitted as beam B17 with a 138.6° angle from the plane of the four-element array 119. Port 3 refers to line feed 103 and the output is transmitted as beam B20 with a 41.4° angle from the plane of the four-element array 124. Port 4 refers to line feed 104 and the output is transmitted as beam B19 with a 104.5° angle from the plane of the four-element array 124.

Clearly, the embodiments illustrated in FIGS. 1-10 are meant to illustrate a wireless system, which minimizes nulls within the wireless system while simultaneously providing diversity. By using what is shown and described herein, a wireless system will now have increased capacity and coverage due to the enhanced signal to interference ratio in the areas of beam overlap. Those having ordinary skill in the art will therefore appreciate the benefit of employing an embodiment of system structures 40 or 50 (FIGS. 4 and 5) or an embodiment of system structures 60 or 100 (FIGS. 6 and 9) for numerous and various wireless switched beam systems for CDMA or other applications.

The invention claimed is:

1. A system, comprising:

an antenna;

a first circuit operably connected to a first line feed and operable to provide a first signal to said antenna; and a second circuit operably connected to a second line feed and operable to provide a second signal to said antenna, the second signal being offset in frequency from the first signal, wherein the first line feed is separate from the second line feed, said antenna is operable to transmit a first beam corresponding to the first signal, said antenna is further operable to transmit a second beam corresponding to the second signal and partially overlapping the first beam, the second beam being offset in frequency to the first beam to thereby minimize a formation of nulls within the first beam and the second beam.

2. The system of claim 1, further comprising:

a third circuit operable to provide a third signal to said antenna, the third signal being offset in frequency from the second signal, wherein said antenna is operable to transmit a third beam corresponding to the third signal and partially overlapping the second beam, the third beam being offset in frequency to the second beam to thereby minimize a formation of nulls within the second beam and the third beam.

3. The system of claim 2, further comprising:

a first Butler matrix and a first element array collectively operable to transmit the first beam and the third beam with a first polarization.

4. The system of claim 2, further comprising:

a fourth circuit operable to provide a fourth signal to said antenna, the fourth signal being offset in frequency from the third signal, wherein said antenna is operable to transmits a fourth beam corresponding to the fourth signal and partially overlapping the third beam, the fourth beam being offset in frequency to the third beam to thereby minimize a formation of nulls within the third beam and the fourth beam.

5. The system of claim 4, wherein said antenna further includes:

a first Butler matrix and a first element array collectively operable to transmit the first beam and the third beam with a first polarization; and a second Butler matrix and a second element array collectively operable to transmit the second beam and the fourth beam with a second polarization, wherein the second polarization is orthogonal to the first polarization to thereby further minimize a formation of nulls within the first beam, the second beam, the third beam, and the fourth beam.

6. A system, comprising:

an antenna;

a plurality of circuits operable to provide a plurality of signals to said antenna, each of the plurality of circuits being operably connected to a separate line feed, wherein a first signal in each pair of adjacent signals is offset in frequency from a second signal in each pair of adjacent signals;

wherein said antenna is operable to transmit spatially distinct beams corresponding to the plurality of signals, and wherein a first beam in each pair of adjacent beams partially overlaps and is offset in frequency from a second beam in each pair of adjacent beams to thereby minimize a formation of nulls in the spatially distinct beams.

7. The system of claim 1, wherein the first line feed corresponds to the first beam and the second line feed corresponds to the second beam.

8. The system of claim 6, wherein each separate line feed corresponds to of the spatially distinct beams.

* * * * *

UNITED STATES PATENT AND TRADEMARK OFFICE
CERTIFICATE OF CORRECTION

PATENT NO. : 7,272,364 B2
APPLICATION NO. : 10/335605
DATED : September 18, 2007
INVENTOR(S) : Frank et al.

It is certified that error appears in the above-identified patent and that said Letters Patent is hereby corrected as shown below:

In Column 1, Line 20, delete “amounts” and insert -- amount --, therefor.

In Column 5, Line 13, delete “clement” and insert -- element --, therefor.

In Column 6, Line 29, delete “45” and insert -- 45° --, therefor.

Signed and Sealed this

Second Day of June, 2009

John Doll

JOHN DOLL
*Acting Director of the United States Patent and Trademark Office*